Figure 1:
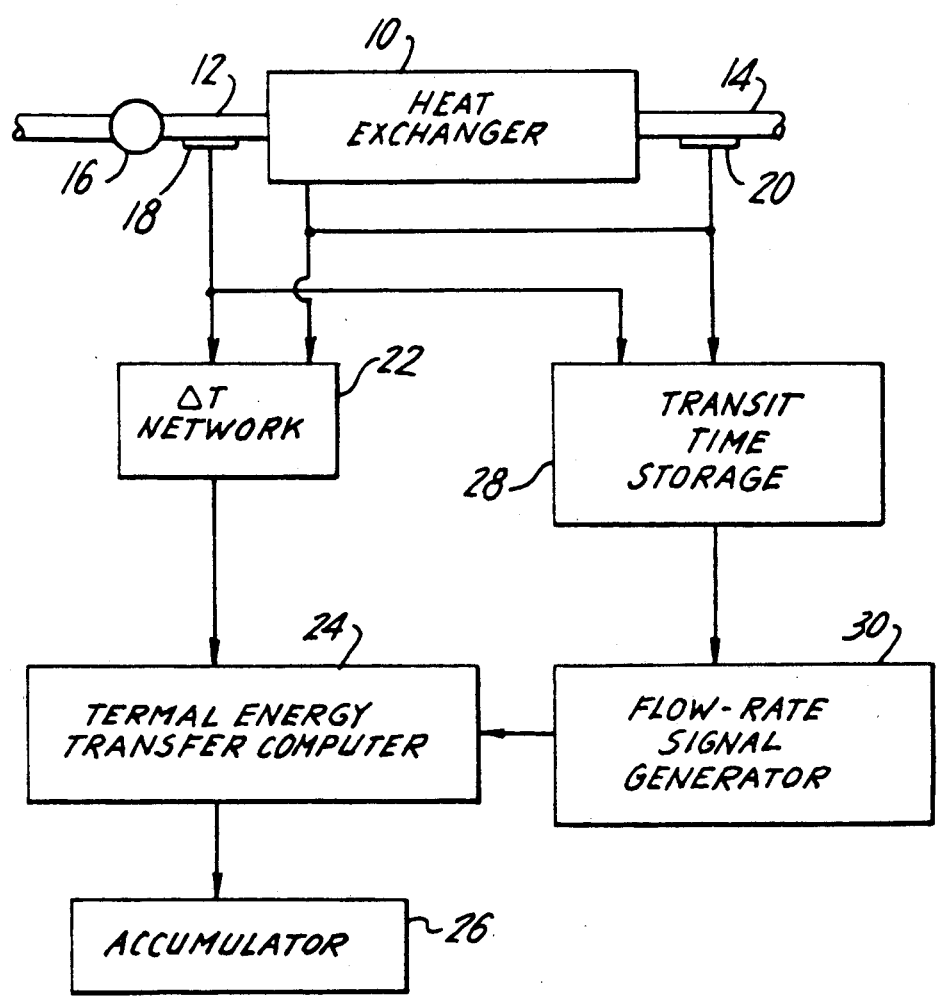

United States Patent [19]

Feller

[11] Patent Number: 5,026,171

[45] Date of Patent: Jun. 25, 1991

[54] APPARATUS FOR FLOW RATE AND ENERGY TRANSFER MEASUREMENTS

[76] Inventor: Murray F. Feller, Box 1247, Dunnellon, Fla. 32630

[21] Appl. No.: 362,682

[22] Filed: Jun. 7, 1989

[51] Int. Cl.$^5$ .................... G01K 17/16; G01K 17/10
[52] U.S. Cl. .................... 374/41; 73/861.95; 374/40
[58] Field of Search .................... 374/40, 41, 54; 73/861.95

[56] References Cited

U.S. PATENT DOCUMENTS

| | | | |
|---|---|---|---|
| 2,536,082 | 1/1951 | Perkins | 73/861.95 |
| 2,633,747 | 4/1953 | Lindstrom | 374/41 |
| 2,776,565 | 1/1957 | Hudson | 73/861.95 |
| 2,799,165 | 7/1957 | Varvel | 73/861.95 |
| 3,477,289 | 11/1969 | Wiebe | 374/142 |
| 3,543,578 | 2/1968 | Sampson | 73/861.95 |
| 3,971,252 | 7/1976 | Onoda | 374/41 |
| 4,048,852 | 9/1977 | Sakakibara et al. | 374/41 |
| 4,224,825 | 9/1980 | Feller | 374/41 |
| 4,228,815 | 10/1980 | Juffa et al. | 73/861.95 |
| 4,237,730 | 12/1980 | Feng | 73/861.95 |
| 4,335,616 | 6/1982 | Oliva et al. | 73/861.95 |
| 4,388,003 | 6/1983 | Feller | 374/41 |
| 4,393,919 | 7/1983 | Anderson | 374/41 |
| 4,412,647 | 11/1983 | Lampert | 236/36 |
| 4,458,709 | 7/1984 | Springer | 73/861.95 |
| 4,459,041 | 7/1984 | Knauss et al. | 374/39 |
| 4,485,449 | 11/1984 | Knauss | 374/41 |
| 4,491,024 | 1/1985 | Miller, Jr. | 73/204.21 |
| 4,593,357 | 6/1986 | Van Ostrand et al. | 364/551.01 |
| 4,628,743 | 12/1986 | Miller, Jr. et al. | 73/861.95 |
| 4,720,806 | 1/1988 | Schippers et al. | 364/551.01 |
| 4,748,573 | 5/1988 | Sarandrea et al. | 364/551.01 |
| 4,773,023 | 9/1988 | Giardina | 374/41 |
| 4,810,100 | 3/1989 | Shavit et al. | 374/40 |
| 4,938,079 | 7/1990 | Goldberg | 73/861.95 |

FOREIGN PATENT DOCUMENTS

| | | | |
|---|---|---|---|
| 1147574 | 6/1983 | Canada | 374/41 |
| 0065201 | 11/1982 | European Pat. Off. | 374/41 |
| 0318388 | 5/1989 | European Pat. Off. | 73/861.95 |
| 2161338 | 6/1973 | Fed. Rep. of Germany | 374/41 |
| 2639729 | 3/1978 | Fed. Rep. of Germany | 73/861.95 |
| 0167820 | 7/1986 | Japan | 374/54 |
| 1084653 | 9/1967 | United Kingdom | 73/861.95 |
| 2068128 | 8/1981 | United Kingdom | 374/41 |
| 82/02591 | 8/1982 | World Int. Prop. O. | 374/54 |

Primary Examiner—William A. Cuchlinski, Jr.
Assistant Examiner—Diego F. F. Gutierrez

[57] ABSTRACT

Temperaature sensors at the inlet and outlet of a heat exchanger are utilized in the disclosed apparatus to measure the temperature of the fluid and to ascertain the the time taken by a localized gradient in heated or cooled fluid to pass through the heat exchanger at the start of a heating or cooling episode in order to obtain the flow rate of fluid through the heat exchanger; a representation of the flow rate is stored; and thereafter, during that heating or cooling episode, the stored flow-rate representation is utilized in deriving flow-rate and energy transfer measurements.

22 Claims, 5 Drawing Sheets

APPARATUS FOR FLOW RATE AND ENERGY TRANSFER MEASUREMENTS

The present invention relates to apparatus useful in measuring the flow rate of fluid and the thermal energy in fluid that is transferred to or from a heat exchanger.

The invention has particular application to systems in which thermal energy is distributed by circulating liquid, from a common source such as a furnace or a central air-conditioning plant to diverse heat exchangers, e.g., radiators or coolers of each apartment in an apartment house. Proper allocation of the thermal energy consumption in each apartment in a practical manner has been a long-recognized problem.

Various approaches to allocation of expense of heating and cooling apartments have been proposed. In one such system, the "on" times of a thermostat in each apartment are relied on in arriving at a basis for cost allocation. Such systems provide only a rough approximation of the thermal energy delivered to or dissipated by each separately monitored heat exchange apparatus.

My U.S. Pat. No. 4,224,825 issued Sept. 30, 1980 represents presently known apparatus for measuring the thermal energy delivered to a heat exchanger. It includes sensors for the inlet and outlet temperatures of the heat exchanger; a flow sensor commonly including a turbine rotor in the fluid flow passage; and a computer that derives the delivered thermal energy as the product of the flow rate and the temperature difference between the inlet and the outlet of the heat exchanger. The flow-responsive turbine is installed in the flow passage, and it involves connecting lines from the turbine to the circuit portion of the apparatus. The cost of the flow sensor and its connecting lines represent a cost factor that is particularly significant where there are many units to be monitored separately and where they are located far from central monitoring equipment.

The present invention provides novel apparatus for measuring the thermal energy transfer by a heat exchanger. The measurement is relatively accurate and the cost of the installed apparatus is relatively low. Discrete flow detectors, their installation, and connecting lines from the installed detectors are eliminated. The thermal energy may be transferred either in the heating mode or the cooling mode by a heat exchanger; and the heat exchanger may be a single radiator or a cooling unit or a dual purpose unit. Multiple units connected together and having a single inlet and a single outlet may also constitute a "heat exchanger".

A further aspect of the invention relates to flow-rate measuring apparatus. It is of course common for flow-rate indicators to provide continuous output derived typically from a flow-activated member in the flow passage. It is also known that a flow measurement can be obtained by creating a "flag" in the flowing fluid, and a succession of "flags" may be created in providing flow-rate measurements. The "flag" may be a localized volume of the fluid that is heated by a burst of current through a heater installed in the flow passage. That flagged volume is then sensed by two detectors spaced apart along the flow path. Such a system involves multiple devices installed in the flow passage, with attendant expense. Moreover, it may not be practical to create such a flag; high-sensitivity detectors may be required; and a sustained flow-rate signal may be required in situations where it is impractical to create frequent flags.

The flow-rate measuring apparatus described in detail below includes flow-rate measurement means that operates in a preliminary time interval, a storage device that stores the measurement, and a means for deriving a flow-representing signal from storage, continuing long after the preliminary time interval.

The novel flow-measurement apparatus is ideal, for example, in thermal energy transfer apparatus described above. During each idle interval between heating or cooling episodes, the fluid in the heat exchanger approaches room temperature. A temperature gradient is developed as the heated or cooled fluid starts to enter the heat exchanger, this transition representing a "marking" portion of the fluid. It occurs without resort to gradient-producing devices. However, it occurs only once in each heating or cooling episode, when circulation of the liquid is first started by opening a valve or by starting a circulating pump. There is no recurrence of a significant temperature gradient in the fluid during the extended period of a particular heating or cooling episode. A representation of the flow rate is derived from signals that represent the time of transit of the marking portion of the fluid from one detector to another along its path, there being a known volume of fluid in the heat exchanger between the detectors; that flow-rate representation is stored; and the flow-rate representation remains available for providing later flow-rate representations during each energy-transfer episode, in the form of the signal derived from the storage means.

The illustrative apparatus detailed below and shown in the drawings, in its various forms, is apparatus for measuring energy transfer. It involves temperature sensors at the inlet and outlet ends of the passage through a heat exchanger and means for deriving the temperature-difference signal used in the energy-transfer calculation. The described apparatus also involves detectors at spaced-apart locations that are connected in circuits for detecting a temperature gradient or marking portion of the fluid that traverses the detectors successively; it includes a storage device for storing a representation of the time taken by the thermal-gradient portion of the fluid that flows from one detector to the other; and it includes means for deriving a flow-rate-representing signal from the storage. The flow-rate detectors could be at any locations that are spaced apart appropriately, but they are eminently effective at locations at the inlet and outlet of the heat exchanger, being readily accessible locations. Moreover, the same temperature sensors are utilized in the described apparatus both for sensing the inlet-to-outlet temperature difference and in the flow-rate detection. The resulting apparatus is both economical per se and it involves a minimum of connecting lines to the heat exchanger.

In the flow-rate measurement apparatus as described, the stored value directly represents the transit required for the liquid to move past two detectors in succession. Specifically, that stored value is inversely proportional to the flow rate, but nevertheless it is a representation of the flow rate. The stored value may be in analog form, such as a charge on a capacitor, or it may be a digital value, stored in a register. In each form, the illustrative apparatus includes a means for deriving from storage a flow-rate-representing periodic signal whose frequency is proportional to the flow rate. The described analog storage circuit is particularly effective for the application involved, because of the remarkably low leakage paths of the elements connected to the storage capacitor. The digital storage is rigorously constant, not being affected by leakage and other limiting considerations related to capacitors in long-term storage of analog values.

It is presumed that the flowing medium does not undergo a change of state, and that the flow passage is sufficiently constrained for the "marking" portion of the medium at the inlet, characterized by a distinct temperature gradient, to reach a detector at a downstream location of the flow passage. Accordingly, while the invention clearly applies to circulating liquid systems, it also has application to systems in which the flowing medium, if gaseous, yields equivalent performance.

Figure 2:
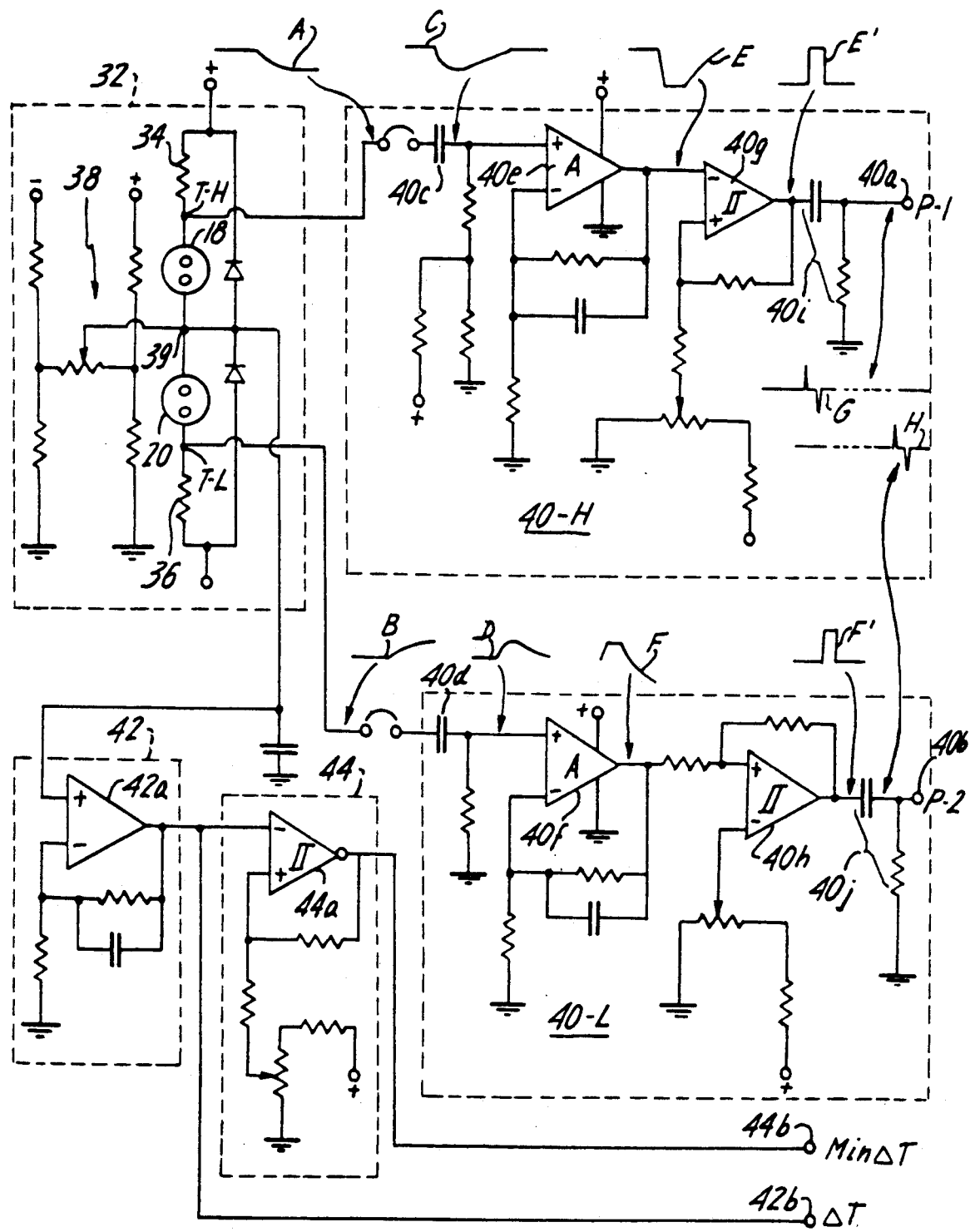
Figure 3:
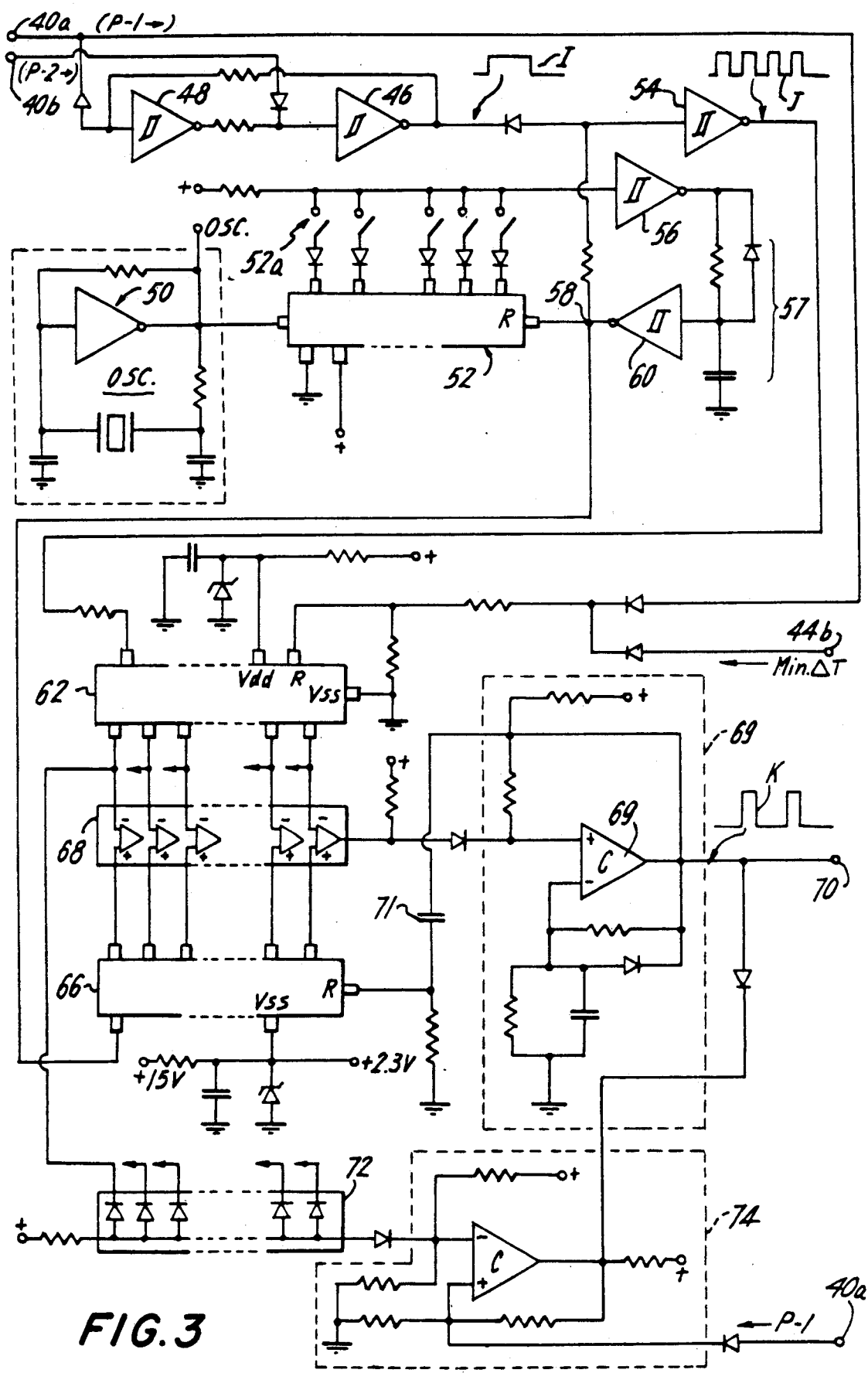
Figure 4:
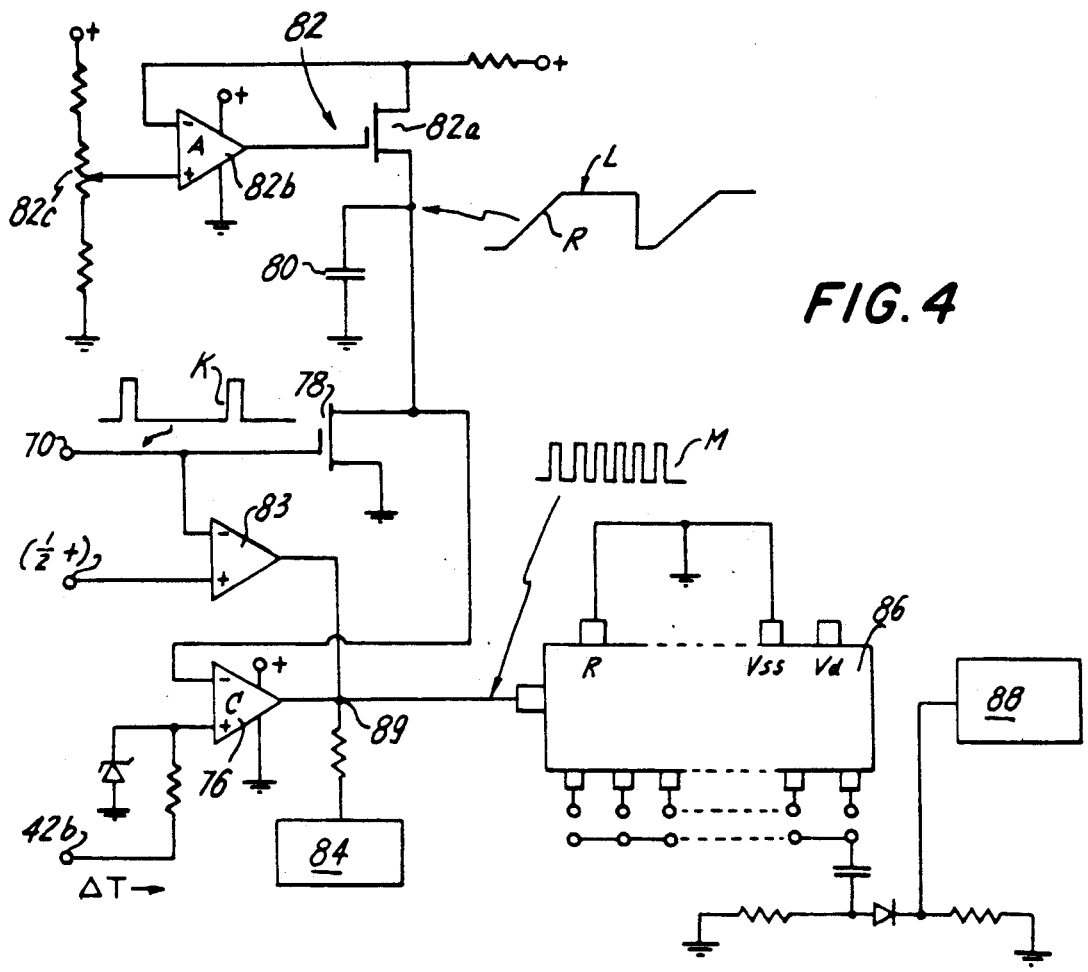
Figure 5:
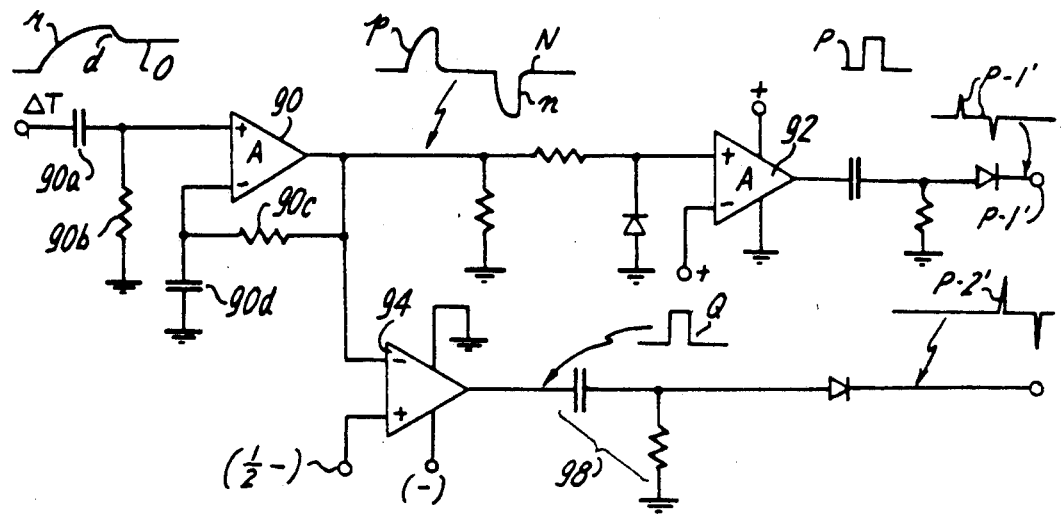
Figure 6:
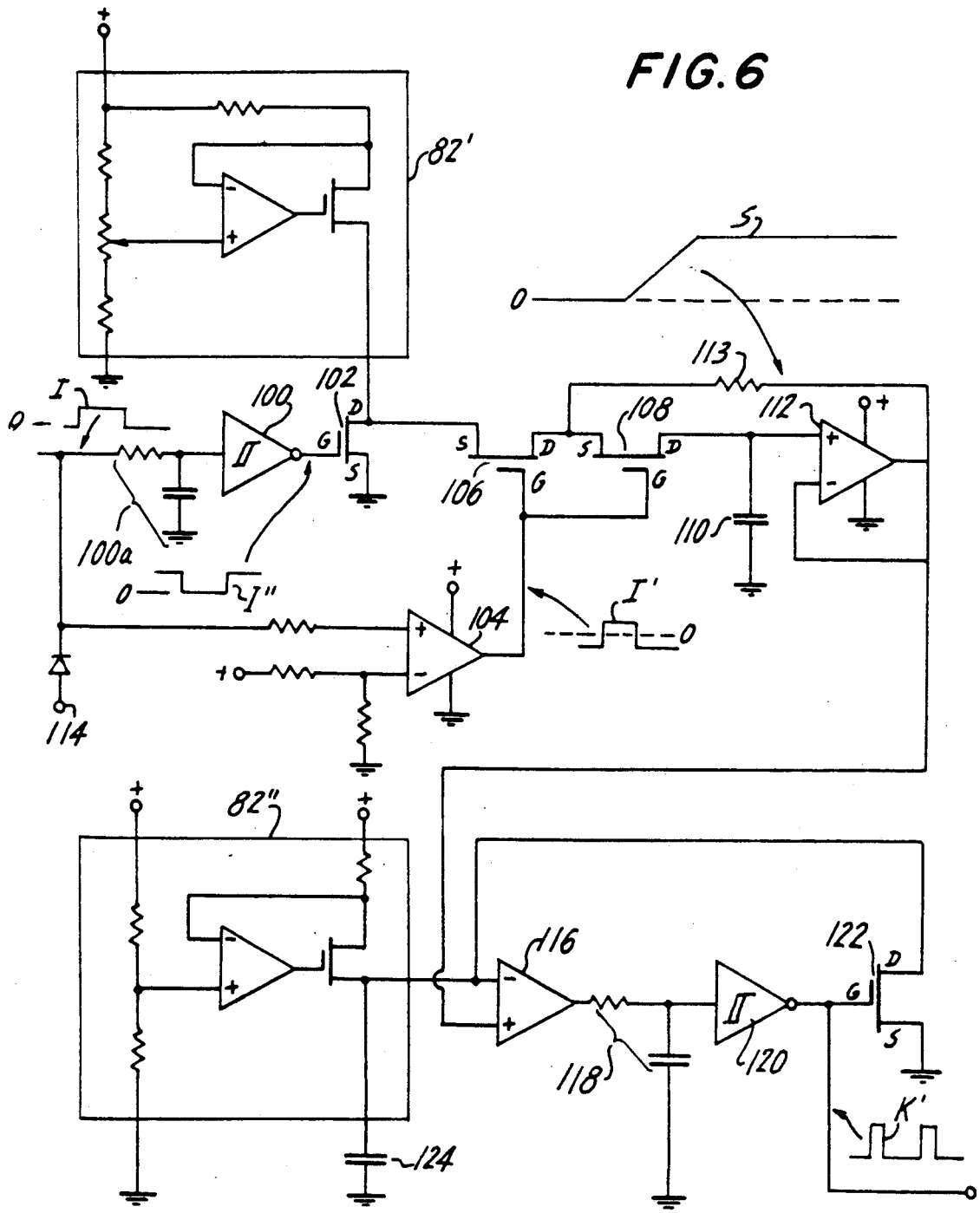

The nature of the invention and its further advantages and novel aspects will be fully appreciated from the following detailed description of the various illustrative embodiments of the invention in its various aspects, shown in the accompanying drawings. In the drawings:

FIG. 1 is a block diagram of an illustrative embodiment of certain aspects of the invention;

FIGS. 2, 3 and 4, together, are a schematic diagram of one form of the apparatus in FIG. 1, illustrative of the invention of FIG. 1 and further aspects of the invention;

FIG. 5 is a schematic diagram of an alternative for part of the apparatus of FIG. 2; and FIG. 6 is a schematic diagram of a second form of apparatus of the kind in FIG. 1, being an illustrative embodiment of further aspects of the invention.

Referring now to the drawings, FIG. 1 shows a heat exchanger 10 and inlet and outlet pipes 12 and 14. Parts 10, 12 and 14 form a flow passage for the flowing medium, typically including a furnace or a liquid chiller (not shown). The heat-exchanger may be a radiator, a cooler or a dual-purpose device, as well as multiple units in an apartment or a suite of offices that are connected serially or in parallel to a common inlet and a common outlet such that their performance is equivalent to a single heat exchanging unit in the apparatus of FIG. 1.

Valve 16 in FIG. 1 is ordinarily controlled by a thermostat (not shown) to turn the flow on or off. High temperature sensor 18 is located at the inlet end of the apparatus and low-temperature sensor 20 is located at the outlet end of the heat exchanger in the apparatus shown.

Temperature sensors 18 and 20 are connected to a network 22 for deriving the temperature difference between the inlet and the outlet of the apparatus. The temperature-difference signal forms one input to thermal energy transfer computer 24, which provides output representing the thermal energy transfer as it occurs, a rate. Accumulator or integrator 26 accumulates the total of the thermal units delivered over a period of time.

The same temperature sensors 18 and 20 that provide the $\Delta T$ measurement are utilized in the apparatus of FIG. 1 for the additional purpose of providing flow-rate measurement signals. In the apparatus of FIG. 1, there is no need for a discrete flow sensor to be installed in the flow passage, and there is no need for connecting lines to such a flow sensor. Moreover, by using the same sensors for $\Delta T$ signals and flow-rate signals, the costs of separate sensors and the cost of installing separate sensors are avoided, and only one set of connecting leads to the heat exchanger is needed.

The liquid in heat exchanger 10 approaches room temperature during the period between heating or cooling episodes, i.e., so long as the thermostat does not call for heat or cooling and valve 16 is closed. Opening of valve 16 (or starting a local circulating pump) initiates a heating or cooling episode. At that time or moments afterward, the temperature at sensor 18 rises (or drops) substantially. After a short time interval, the temperature at the outlet temperature sensor 20 also rises (or drops). The temperature discontinuity or gradient occurring in the liquid as circulation is started represents a "marking portion" of the liquid. A definite time interval passes as that marking portion moves from inlet sensor 18 to outlet sensor 20. This transit time is inversely proportional to the flow velocity and inversely proportional to the (volume) rate of flow, but it constitutes a definite representation of the flow rate.

Providing the transit-time representation of the flow rate in this manner eliminates any dependence on a separate heater in the flow passage to create a marking portion in the liquid, and it avoids reliance on highly sensitive detectors such as ar used in sensing a locally heated "slug" of liquid.

The apparatus of FIG. 1 includes storage means 28 and signal generator 30 to provide a sustained flow-rate representing signal for energy-transfer computation during each heating or cooling episode, inasmuch as the transit-time signals occur only at the start of each such episode.

Network 22 provides a temperature-difference signal to computation unit 24 where a rectangular wave is developed whose duration represents the temperature difference. Signal generator 30 provides an impulse to unit 24 to initiate the temperature-difference wave for each flow-rate unit represented by the storage in unit 24. Each of the rectangular waves is broken into a train of pulses that represent the temperature difference. The total number of those pulses occurring during a succession of flow-rate impulses represents the thermal energy transferred during a monitoring time interval.

Reliance on the measurement of flow rate at the start of each heating episode as the basis for energy transfer throughout that episode introduces only a slight degree of inaccuracy. Anomalies affecting the accuracy that might occur from time to time should be averaged out over any long period of integration of the transferred heat.

FIGS. 2-4 show a circuit for accomplishing the performance described in connection with FIG. 1.

In FIG. 2, unit 32 is a network including a high-temperature sensor 18 and a low-temperature sensor 20, mounted at the inlet and outlet of a heat exchanger. These sensors are temperature-variable devices connected to each other and to resistors 34 and 36 which have connections to positive and negative direct-current sources above and below ground potential. For example, devices 18 and 20 may be integrated-circuit sensors AD 590 made by Analog Devices, their current being linearly responsive to temperature but not responsive to changes of energizing voltage. Network 38 adjusts the temperature-difference output point 39 between the sensors to zero when the same temperature prevails at both sensors. Terminals T-H and T-L are high and low temperature output points in operation of the apparatus as a heating system.

Two circuit channels 40, separately designated 40-H and 40-L in FIG. 2, have respective input connections to junctions T-H and T-L, and they provide output pulses P-1 and P-2, respectively at output terminals 40a and 40b. When the apparatus is used for monitoring the transfer of units of heat, a temperature representing signal A is developed immediately after valve 16 is opened at the start of a heating episode. Signal B is developed when the temperature gradient that produced signal A reaches sensor 20. Passing through capacitors 40c and 40d, signals A and B appear as modified signals C and D. They are amplified and limited in high-gain amplifiers 40e and 40f, yielding signals E and F. These signals are converted into brief rectangular pulses E', F' by inverting pulse generator 40g and non-inverting pulse generator 40h; and after passing R-C filters 40i and 40j, each of the resulting signals G and H has a positive spike followed by a negative spike. The positive spikes are pulse P-1 and P-2; the negative spikes are not used.

Signals C and D represent rate-of-change of the inlet and outlet temperatures. Omitting capacitors 40c and 40d is a contemplated alternative, and in that case, the flow-representing pulses P-1 and P-2 would represent temperature increases. In any case, the leading portion of each signal A to H represents the occurrence of a temperature rise, ultimately resulting in pulses P-1 and P-2 at terminals 40a and 40b.

When valve 16 is first opened and hot water starts to flow, replacing cooler liquid in the heat exchanger, the signals A through H are developed as described. Signal P-1 is developed when a marking portion of the liquid in the form of a cold-to-hot gradient in the liquid passes sensor 18. Signal P-2 is developed when, after a transit time, the marking portion of the liquid reaches sensor 20. Some turbulence occurs along the path and the temperature of the initially hot liquid drops in passing through the heat exchanger, but the liquid reaching outlet temperature sensor 20 retains an ample and reasonably defined temperature gradient for activating channel 40-L.

The time interval between signals P-1 and P-2 is a representation of the flow rate, in that there is a definite interdependence between the liquid's transit time and its flow rate. The time intervals increase with lower flow rates.

In FIG. 2, the temperature-difference signal from the junction 39 of sensors 18 and 20 is supplied to high-gain linear amplifier 42, here a non-inverting proportional amplifying device 42a. The resulting signal $\Delta T$ appears at terminal 42b. Signal $\Delta T$ is also the input to inverting amplifier 44 which has a switching characteristic. The output of device 44a goes from low to high at terminal 44b when signal $\Delta T$ exceeds a threshold signal Min. $\Delta T$. So long as $\Delta T$ remains below the level Min. $\Delta T$, that part of the apparatus that integrates heat measurements is shut off. This occurs when the temperature difference between the inlet and the outlet of the heat exchanger falls below a significant value.

FIG. 3 is a schematic, basically of that portion of the embodiment of FIGS. 2–4 that performs the storage and flow-rate signal-generating functions of units 28 and 30 in FIG. 1.

In FIG. 3, input terminals 40a and 40b are the output terminals in FIG. 2 bearing the same numerals, the terminals where pulses P-1 and P-2 appear. In FIG. 3, pulse P-1 turns on a bistable switching device 46. A triggering device 48 responds to a later pulse P-2, resetting device 46. Rectangular wave I at the output of device 46 represents the interval from P-1 to P-2.

Oscillator 50 provides a high-frequency signal to frequency divider 52. Switch-controlled connections 52a are provided for selecting a desired ratio. This divider is a scaler that provides part of the means for calibrating the apparatus so that its readings take into account the known volume between the inlet and the outlet of the heat exchanger. Signal I is applied to the input of switching device 54, and the scaled oscillator signal from divider 52 is also applied to the input of device 54. The output is a train of oscillator pulses J that start with pulse P-1 and end with pulse P-2 The frequency-divided signal from divider 52 reaches switching inverter 56 via the selected switches 52a that determine the scaling factor. When the divider reaches the selected count, its output triggers device 56 whose output is slightly delayed in network 57 and triggers pulse generator 60 Pulses from generator 60 at junction 58 reset the divider for resumed counting of oscillator pulses.

The gated train of pulses J that occur between pulses P-1 and P-2 are transmitted to the input of storage counter 62. This counter is reset to zero by pulse P-1 on terminal 40a at the start of each counting interval The counter is held at zero by the output of switching device 44 whenever the value of $\Delta T$ drops to the point that is too low for the heat exchanger to provide significant output to the space that is to be heated. This condition develops at the end of a heating episode, a while after the flow of liquid has been interrupted under control of a thermostat.

At the start of a heating episode, counter 62 counts pulses of oscillator 50 until pulse P-2 ends pulse train J. Counter 62 is thus a digital device for storing a representation of the time interval between pulses P-1 and P-2, being a measure of the flow rate.

Pulses at terminal 58 (FIG. 3) are also supplied to counter 66. These pulses have the same frequency as the pulses J to storage counter 62. Corresponding stages of counters 62 and 66 are compared by coincidence detector 68. Counter 62 retains its stored count. When the value in counter 66 matches that in counter 62, coincidence detector 68 provides a high signal to pulse generator 69. Each pulse at terminal 70 represents a flow increment. This pulse resets counter 66, which immediately resumes counting of the pulses at output terminal 58 of scaler 52. Accordingly, a train of pulses K appears at terminal 70 at time intervals equal to the period P-1 to P-2. Counter 66 is reset cyclically via capacitor 71, generating a continuing signal K whose frequency is proportional to the flow rate, each pulse representing a unit of flow.

An inhibiting network 72 has input or controlled connections to corresponding count-representing terminals of counter 62. Inhibiting network 72 is a coincidence detector that produces an inhibiting signal when all the terminals of counter 62 signify that the maximum counter capacity has been reached. The output from detector 72 toggles flip-flop 74 to suppress pulse train K. This occurs when there is an excessively long (and meaningless) time interval between a pair of pulses P-1 and P-2. The next pulse P-1 resets flip-flop 74. That next P-1 pulse also resets storage counter 62, starting a new flow-signal storing operation.

FIG. 4 is a schematic of a circuit for utilizing the $\Delta T$ output at terminal 42b of FIG. 2 and the flow-representing pulse train K of FIG. 3, for computing the delivered heat.

The amplified $\Delta T$ signal from output terminal 42b in FIG. 2 is applied to the (+) input of comparator 76.

The flow-representing pulse train K at terminal 70 of FIG. 3 controls FET 78 to produce a momentary discharging shortcircuit across capacitor 80, then allowing the capacitor to charge along a straight-line ramp R to yield wave L. Network 82 is a constant-current source for supplying charging current to capacitor 80. Network 82 includes an FET 82a whose current is set by the output of amplifier 82b at a value selected by adjustment of potentiometer 82c at the input of that amplifier. This current is such that ramp R completes its linear rise to the highest expected value of $\Delta T$ within the shortest pulse-to-pulse period of flow representing signal K. Accordingly, the flat segments at the top of wave L represent the time from the end of each ramp R to the start of the next pulse K. (At the highest frequency of the flow-representing pulses K, there are no flats at the top of the wave L; in that condition, ramp capacitor 80 is short-circuited by FET 82a as soon as the ramp reaches its peak.)

Wave L is applied to the (−) input of comparator 76, whose output is switched on until it exceeds the value of $\Delta T$ at the (+) input of comparator 76. The "on" period of comparator 76 corresponds to the value of $\Delta T$ because ramp R is linear and comparator 76 is switched off after a time interval proportional to $\Delta T$.

When a pulse of wave K causes short-circuiting of capacitor 80, wave L has a short-time flat bottom, corresponding to the width of a pulse in wave K The output of comparator 76 is short-circuited by comparator 83, so that the "on" time at the output of comparator 76 is limited strictly by ramp R in relation to $\Delta T$ at the input of this comparator.

Oscillator 84 chops the output of comparator 76 into a number of pulses corresponding to the value of $\Delta T$. Pulses M at joint 80 are divided (as desired) by a further scaling divider 86. This provides a further or supplemental facility for calibrating the output of the apparatus in terms reflecting the volume of the heat exchanger, in this way to convert the P-1 to P-2 interval, which is inversely related to flow velocity, into a rate-of-flow reading that takes the volume of the heat exchanger into account.

When the flow rate is low, pulses K are separated by the long time period of time that separates pulse P-2 from its preceding pulse P-1, so that there are few pulse trains M in a given time interval. For higher flow rates, pulses K recur more frequently, and there are more pulse trains M in a given time interval. The scaled output from divider 86 is integrated in pulse counter 88 whose reading represents heat delivered over the period of integration. Because there are as many ramps R and pulse trains M in any period of time as there are flow-representing pulses in wave K, the pulses entered into counter 88 represent the product of the flow-rate and $\Delta T$.

The flow-rate representation stored in counter 62 at the start of each heating episode remains as a stable unchanging reference that is used repeatedly during the heating episode which may be long or short. Consequently, the flow-rate representing pulse train K is a constant-frequency signal following each initial pulse pair P-1 and P-2. Minor changes may occur in the actual flow rate during any one heating episode. The flow rate during a heating episode may drop and rise to some extent, compared to the flow rate represented by the transit time interval P-1 to P-2. However, the effect of such deviations should become averaged over any long monitoring period, so that the accumulated value in integrator 88 represents an accurate measurement over an averaging period of time.

FIG. 5 is a modification of FIG. 2. Where FIG. 2 provides separate channels responsive to separate temperature shifts at T-H and T-L for producing pulses P-1 and P-2, FIG. 5 utilizes mainly a common channel for responding to a temperature gradient affecting sensors 18 and 20 in succession.

In FIG. 5, the $\Delta T$ signal represented by curve O is supplied to a comparator 90 at the start of each heating episode. Comparator 90 has a high-pass R-C coupling network 90a, 90b to its (+) input and a high-pass R-C feedback network 90c, 90d to its (−) input. These filters cause amplifier 90 to generate a large positive signal excursion in its output curve N during the initial rise r of curve O and a large negative signal excursion n during the decline d of curve O. Switching amplifier 92 responds to the first of these excursions r by producing a rectangular wave P. Similarly, inverting and switching amplifier 94 produces wave Q in response to the later decline d of wave O. Curve segments r and d represent sudden changes of $\Delta T$ that occur successively when the cold-to-hot gradient (formed at the start of each heating episode) passes sensors 18 and 20. Differentiating R-C couplings 96 and 98 yield pulses P-1' and P-2' that are the same as those in FIG. 2. Amplifiers 92 and 94 are oppositely polarized so that amplifier 92 responds to the positive excursion of wave N whereas amplifier 94 responds to the negative excursions of wave N.

The apparatus of FIGS. 2–4, and that apparatus as modified in FIG. 5, have been described in its application to monitoring thermal energy transfer in a heating system, in which circulating hot water (or other liquid) from a central furnace is turned on and off at each separately controlled and separately monitored heat exchanger. With proper attention to polarities, the same apparatus is equally useful for cooling systems, in which liquid is chilled at a central cooling plant and circulated to complements of separately controlled and separately monitored heat exchangers used in cooling separate suites, apartments, etc. The same apparatus may be used for monitoring heat exchangers that serve alternatively in heating and in cooling capacities, with proper attention to changed signal polarities that develop in the circuit when changing from heating to cooling service. Indeed, it is contemplated that the circuit may incorporate automatic polarity-switching circuits responsive to the sensed temperatures. Separate integrators may be used, as appropriate, for registering energy transfer during heating duty and cooling duty.

In the apparatus of FIGS. 2–4 and 5, the interval P-1 to P-2 as a measure of flow rate is obtained at the start of each heating episode, and a representation of that measure of flow rate is stored in a counter, digitally. As such, it endures without change during even protracted heating episodes. The apparatus of FIG. 6 is a monitoring system utilizing the same basic constituents except that the storage is performed by an analog circuit.

In FIG. 6, a signal I is a rectangular input wave whose duration is equal to the transit time between P-1 and P-2 in the apparatus described above, and all of the circuit of FIGS. 2 and 3 that develops wave I is incorporated by reference here as the apparatus to produce that wave. Wave I is applied to an inverting switching amplifier 100, for example a Schmitt trigger, that controls the gate of FET 102. Wave I is also applied to the (+) input of a comparator 104 whose output is a rectangular wave I' that swings above and below ground potential.

A constant-current network 82' is provided in FIG. 6 that is the same as network 82 in FIG. 4, using components having appropriate values. Constant-current network 82'0 is connected between the drain of FET 102 and the source of FET 106. The output of amplifier 104 is connected to the gates of FET 106 and FET 108. A storage capacitor 110 is connected between the drain of FET 108 and ground. An amplifier 112 has its (+) input connected to the ungrounded terminal of capacitor 110 and its output connected to the drain of FET 106 and to the source of FET 108 via resistor 113.

The inverted wave I' at the output of device 100 is applied to the gate of FET 102 which goes from conducting state (from S to D) to a non-conducting state. Amplifier 104 drives the gates of FET 106 and FET 108 positive, so they become strongly conductive. Accordingly, capacitor 110, supplied by constant current source 82', develops a ramp-voltage wave form S. At the end of the input pulse, FET 106 and FET 108 are driven to cutoff and the capacitor remains charged. Its charge is linearly proportional to the transit time of the liquid from sensor 18 to sensor 20 of FIG. 1, as represented by the time interval P-1 to P-2 (FIG. 2).

The charge on capacitor 110 can be sustained for an extremely long time; leakage at the (+) input of amplifier 112 as shown is only about one picoampere and the leakage of FET 108 is only about 10 picoamperes. The source of FET 108 is driven by the output of FET 106 during cut-off so that there are only a few millivolts across the device, hence low leakage current. Discharge time constants of 1000 to 10,000 seconds (2.8 to 28 hours) can readily be attained.

FET 106 and FET 108 return to non-conducting state just before FET 102 starts to conduct because of the delay R-C coupling 100a at the input to device 100. The short-circuit condition of FET 102 starts too late to discharge capacitor 110.

A reset pulse at input 114 forces FET 106 and FET 108 into conduction so that capacitor 110 is discharged by FET 102, when desired, as by a signal from terminal 44b in FIG. 1, when the inlet-to-outlet temperature differential is below a significant value.

The voltage stored by capacitor 110 is coupled by amplifier 112 to the (+) input of operational amplifier 116 in FIG. 6. It may be assumed that the voltage at the (−) input of amplifier 116 is zero and there is a 5-volt positive potential at its (+) input. After a short delay due to R-C filter 118, a high positive input voltage is applied to Schmitt trigger 120. The inverted output of trigger 120 is applied to FET 122, which becomes non-conducting. Ramp capacitor 124 gets charging current from constant-current source 82" (like source 82). Its charge rises until, at the (−) input of comparator 116, it exceeds slightly the charge on storage capacitor 110 at the (+) input of comparator 116. At that point, the output of amplifier 116 goes low, FET 122 becomes conducting, and ramp capacitor 124 is discharged. Another charging process commences and is interrupted, cyclically creating signal K' whose frequency is proportional to the flow rate. Signal K' then serves as input to the computer circuit of FIG. 4. The analog circuit of FIG. 6 is thus a alternative to the digital portion of the flow-rate frequency generator in FIG. 3. Inasmuch as the embodiment of FIG. 3 avoids the leakage limitation of the analog circuit of FIG. 6, that of FIG. 3 is preferred.

The foregoing flow-monitoring apparatus is notably useful as part of a heating or cooling system, in which a temperature gradient is sensed at the start of each heating or cooling episode. The monitoring circuit stores a measure of the flow rate, which remains available for the balance of that episode. It is unnecessary to install a discrete flow sensor in the liquid flow path; and apart from connections to the temperature sensors, no separate electrical conductors extending to the heat-exchange apparatus are needed for deriving a measure of the flow rate.

As part of the heating or cooling system, the flow-rate derivation circuit relies on a marking portion of the liquid that develops inherently in the system at the start of each heating or cooling episode. No separate device is needed in the flow passage to create the marking portion.

For the foregoing reasons, the novel apparatus for providing an enduring signal that represents flow rate has unique advantages as part of heating and cooling monitoring apparatus. And yet it is also useful in other applications, where some of its distinctive attributes may not be needed.

The apparatus described in detail above is subject to a wide range of modification and varied application by those skilled in the art. Consequently, the appended claims should be construed broadly, in relation to equivalents and in varied applications of the invention.

What is claimed is:

1. Apparatus for providing a measure of the thermal energy transferred between an energy transfer device and liquid traversing a passage that extends through the device from an inlet end to an outlet end of the device, said apparatus including
   first means for sensing the temperatures at the inlet and outlet ends of the device,
   second means for providing and storing a representation of the flow rate of the liquid flowing through the device during a preliminary time interval,
   third means responsive to the flow rate representation stored during the preliminary time interval for providing a succession of flow-rate representing signals during an extended period of time following said preliminary time interval, and
   fourth transferred-energy representing means responsive to said first means and to said third means for providing a measure of the thermal energy transferred during said extended period of time.

2. Apparatus as in claim 1 wherein the apparatus includes means for causing the liquid to start to flow along a path entering and extending through the energy transfer device, the temperature of the portion of the liquid in the energy transfer device just before flow is started being significantly different from the temperature of the portion of the liquid that enters and flows through the energy transfer device after the start of flow of the liquid so that there is a temperature gradient between said portions of the liquid, and wherein said second means includes detectors at spaced-apart locations along said path of the liquid, said detectors being successively responsive to said temperature gradient as it reaches said spaced-apart locations.

3. Apparatus as in claim 2, wherein said second means comprises a storage capacitor and means responsive to said spaced-apart detectors for progressively increasing the charge therein during said preliminary time interval as a representation of the flow rate.

4. Apparatus as in claim 2, said apparatus including means for supplying timing signals at a constant frequency at least during said preliminary interval and wherein said second means includes a storage counter for counting the timing signals between the appearances of said marking portion of said liquid at said spaced apart locations.

5. Apparatus as in claim 1, wherein the apparatus includes means for causing the liquid to start to flow into the energy transfer device, the temperature of the portion of the liquid in the energy transfer device just before flow is started being significantly different from the temperature of the portion of the liquid that enters and flows through the energy transfer device after the start of flow of the liquid so that there is a temperature gradient between said portions of the liquid, and wherein said second means includes detectors disposed at spaced-apart locations along said passage, said detectors producing successive signals in response to said temperature gradient in the liquid passing said locations, and wherein said second means includes a storage counter, means for supplying timing pulses to said storage counter, and means for staring and ending entry of the timing pulses into said storage counter in response to successive signals derived from said detectors, respectively.

6. Apparatus as in claim 5, wherein said third means includes a second counter to which said timing pulses are supplied continuously and comparison means for producing a flow rate representing signal each time the second counter attains a count that matches the count in said timing-pulse-storage counter and for resetting said second counter.

7. Apparatus as in claim 2, including means for discontinuing the flow of liquid to said thermal transfer device and for causing resumption of flow of the liquid, the temperature gradient being formed in that liquid which is supplied to the energy transfer device upon resumption of flow of liquid to the energy transfer device.

8. Apparatus as in claim 2, 5 or 7, wherein each of said detectors is responsive to a temperature gradient of the liquid, and wherein said detectors comprise said means for sensing the temperatures at said inlet and outlet ends of the energy transfer device.

9. Apparatus as in claim 1, wherein said first means for sensing the temperatures at the inlet and outlet ends of the device serve not only in said fourth means s aforesaid but additionally in said second means.

10. Apparatus for providing a succession of signals as a measure of the rate-of-flow of liquid along a path, including first means for making a determination of the flow rate during a relatively brief preliminary time interval and for storing a representation of the flow rate determination, and second means responsive to said first means for providing a succession of signals over an extended period of time much longer than said preliminary time interval, each of said succession of signals representing the stored flow rate representation.

11. Apparatus as in claim 10, there being a localized temperature gradient in the liquid along its path, said first means including detecting means responsive to successive arrivals at said spaced-apart locations of said temperature gradient.

12. Apparatus as in claim 10, wherein said flow-rate representing signals are impulses whose frequency is proportional to the flow rate.

13. Apparatus as in claim 11, wherein said first means comprises a storage capacitor and means responsive to said detecting means for progressively increasing the charge therein during said preliminary time interval as a representation of the flow rate.

14. Apparatus as in claim 13, wherein said second means includes means connected to said storage capacitor for generating a periodic flow representing signal whose frequency is proportional to the flow rate.

15. Apparatus as in claim 13, wherein said second means includes a ramp capacitor, a constant-current charging supply for said ramp capacitor, a comparator having respective inputs connected to said capacitors respectively, the comparator being adapted to switch from a charging state to a reset state when the charge in the ramp capacitor matches the charge in the storage capacitor, and a circuit responsive to said comparator in its reset state for discharging the ramp capacitor when the charges in the capacitors match and for causing the comparator to switch into its charging state so that the comparator provides a succession of pulses whose frequency is proportional to the flow rate.

16. Apparatus as in claim 11, said apparatus including means for supplying timing signals at a constant frequency at least during said preliminary interval and wherein said first means includes a storage counter for counting the timing signals between the appearances of said marking portion of said liquid at said spaced apart locations.

17. Apparatus as in claim 16, wherein said second means for providing flow-representing signals includes a comparison counter responsive to said timing-signal supply means, comparing means for comparing said storage counter and said comparison counter and for producing a resetting signal to the comparison counter when the counters match, the comparison counter continuing to be responsive to the timing signal supply means, successive output signals from said comparing means constituting a periodic signal whose frequency is proportional to the flow rate.

18. Apparatus for providing a signal whose frequency is proportional to rate-of-flow of a fluid along a path, including means for generating timing pulses, detectors responsive to the flow of a marking portion of the fluid past two spaced-apart locations along the flow path, a storage counter, gating means responsive successively to said detectors for entering a count of said timing pulses into said storage counter representing the time of transit of the fluid from one of said detectors to the other during an initial timing interval, said storage counter thereafter storing said transit-time representing count, a comparison counter for counting said timing pulses, a coincidence detector for providing an output signal each time the count in said comparison counter matches the count stored in said storage counter, and means responsive to the coincidence detector for resetting the comparison counter when the count therein matches the count in the storage counter for renewed counting of the timing pulses and for providing a periodic signal whose frequency is a measure of the flow rate.

19. Apparatus as in claim 18, wherein said means for generating timing pulses includes a source of time-representing signals and a frequency converter responsive to said time-representing signals, said frequency converter having adjustable calibration means for shifting the response of the converter to the time representing signals by a factor related to the volume of the fluid along the path from one of said detectors to the other.

20. Apparatus for providing a succession of pulses representing a succession of quantities of flow of liquid along a path, including
   first means for obtaining and storing a representation of an initial time interval taken by the liquid to flow from a first location to a second location along the path during an initial operating phase, and
   second means responsive to said first means for generating successive pulses that continue after said initial operating phase at time intervals that equal said initial time interval.

21. Apparatus for providing a measure of thermal energy transfer in a circulating liquid system having means for starting and stopping a flow of supplied liquid passing through a heat exchanger, starting of the flow causing a temperature gradient to be formed in the liquid between the temperature of the supplied liquid and the different temperature of the liquid theretofore in the heat exchanger, said apparatus including
   first means for sensing the temperature of the liquid at the inlet and outlet ends of the heat exchanger,
   second means responsive to said first means for determining the transit time of said temperature gradient through the heat exchanger during an initial operating phase, thereby providing a measure of the flow rate,
   third means for deriving the difference between the temperatures of the liquid at the inlet and outlet ends of the heat exchanger and for computing the transfer of thermal energy as the product of such temperature difference and said measure of the flow rate,
   fourth means for storing a representation of said measure of the flow rate, and
   fifth means responsive to said fourth means for generating a succession of flow-representing signals during a prolonged period following said initial operating phase, said third means being responsive to said flow-representing signals and said first means in computing the transfer of thermal energy occurring after said initial operating phase, while the flow continues and, consequently, while there is no recurrence of the temperature gradient.

22. A method of making operational measurements of a heat exchange device in a circulating liquid system having a device operable to start a flow of liquid and to stop the liquid flow, including the steps of
   starting a flow of supplied liquid through the heat exchange device, a temperature gradient forming initially between the liquid that starts to enter the heat exchange device and the liquid theretofore in the heat exchange device,
   detecting the temperature gradient of the liquid as it passes two locations spaced apart along the liquid passage through the heat exchange device,
   deriving a representation of the flow rate of the liquid from the time between detections of the gradient at said two locations, successively,
   storing the derived representation of the flow rate and thereafter
   generating a succession of representations of the flow rate in dependence on the stored representation of the flow rate,
   continuously determining the difference between the temperatures of the liquid at said inlet and outlet ends of the heat exchanger, and
   deriving the product (a) of the initially derived flow rate representation and of each of the generated succession of flow rate representations, and (b) the temperature difference at the time of each of said flow rate representations, thereby to derive a succession of increments of transferred thermal energy, and accumulating said increments of transferred thermal energy.

* * * * *